United States Patent
Vollmer

(10) Patent No.: US 8,922,200 B2
(45) Date of Patent: Dec. 30, 2014

(54) METHOD AND DEVICE FOR DETERMINING A CURRENT ANGULAR POSITION OF A ROTATABLE MAGNETIC COMPONENT IN AN ELECTRIC DRIVE

(75) Inventor: Ulrich Vollmer, Weilheim (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 13/636,726

(22) PCT Filed: Mar. 17, 2011

(86) PCT No.: PCT/EP2011/054043
§ 371 (c)(1),
(2), (4) Date: Dec. 4, 2012

(87) PCT Pub. No.: WO2011/117135
PCT Pub. Date: Sep. 29, 2011

(65) Prior Publication Data
US 2013/0069638 A1    Mar. 21, 2013

(30) Foreign Application Priority Data

Mar. 22, 2010 (DE) .......................... 10 2010 003 096

(51) Int. Cl.
G01B 7/14 (2006.01)
G01D 5/14 (2006.01)
H02P 6/18 (2006.01)
H02P 23/14 (2006.01)

(52) U.S. Cl.
CPC ...... G01B 7/14 (2013.01); G01D 5/145 (2013.01); H02P 6/185 (2013.01); H02P 23/14 (2013.01)
USPC .............. 324/207.11; 324/207.2; 324/207.21; 324/207.22; 324/207.23; 324/207.24; 324/207.25; 324/207.13

(58) Field of Classification Search
CPC .......... G01D 5/145; G01B 7/14; G01B 7/046; G01B 7/30; H02P 23/14; H02P 6/185; H02K 24/00
USPC .............. 324/207.25, 207.2, 207.22, 207.23, 324/207.24, 207.21, 207.11, 207.13; 702/94
See application file for complete search history.

(56) References Cited

U.S. PATENT DOCUMENTS

| 5,315,224 | A | 5/1994 | Zellman |
| 7,893,649 | B2 | 2/2011 | Lamprecht |
| 8,400,088 | B2 * | 3/2013 | De Belie et al. ......... 318/400.33 |
| 8,547,044 | B2 * | 10/2013 | Vollmer ....................... 318/432 |
| 2007/0032970 | A1 | 2/2007 | Desailly et al. |
| 2009/0251089 | A1 | 10/2009 | O'Gorman et al. |
| 2012/0038303 | A1 * | 2/2012 | Villwock et al. ......... 318/400.33 |

FOREIGN PATENT DOCUMENTS

| AT | 397727 | 6/1994 |
| DE | 10248060 | 5/2004 |
| DE | 10337564 | 3/2005 |
| DE | 102006043683 | 3/2008 |

OTHER PUBLICATIONS

International Search Report for Application No. PCT/EP2011/054043 dated Jun. 11, 2012 (English Translation and Original, 5 pages).

\* cited by examiner

*Primary Examiner* — Tung X Nguyen
*Assistant Examiner* — Son Le
(74) *Attorney, Agent, or Firm* — Michael Best & Friedrich LLP

(57) ABSTRACT

The invention relates to a method for determining the actual angle position of a rotatable magnetic component in an electric drive (10) having an odd number of pole pairs. An actual angle measurement value ($\phi_{AMR,k}$) of the rotatable component is measured using an angle sensor (28) which only measures the actual angle measurement value ($\phi_{AMR,k}$) within a predefined reduced angular area, and an associated device (20) for determining an actual angle position of a rotatable magnetic component in an electric drive (10). According to the invention, the actual angle measurement value ($\phi_{AMR,k}$) measured exclusively for the reduced angular area is converted using the direction and the sign of the magnetic field of the rotatable magnetic component in a clear angular position in non-reduced angular area, the direction and sign of the magnetic field of the rotatable magnetic element (12) being determined by applying first test impulses ($U_a$, $U_b$, $U_c$) to the electric drive (10) and by evaluating the resulting second test impulses ($I_1$, $I_2$, $I_a$, $I_b$, $I_c$) which are produced in the electric drive (10) in reaction with the applied first test impulses ($U_a$, $U_b$, $U_c$).

10 Claims, 2 Drawing Sheets

METHOD AND DEVICE FOR DETERMINING A CURRENT ANGULAR POSITION OF A ROTATABLE MAGNETIC COMPONENT IN AN ELECTRIC DRIVE

BACKGROUND OF THE INVENTION

The invention is based on a method for determining a current angular position of a rotatable magnetic component in an electric drive, and on a device for determining a current angular position of a rotatable magnetic component in an electric drive.

Drives which have a variable rotational speed and are based on synchronous machines constitute the prior art. In order to be able to correctly actuate the synchronous machine, information about the current rotor angle must be available. In this context, the necessary degree of disambiguity is dependent on the number Zp of pole pairs of the motor. The rotor angle must be unambiguously known only within a range of the magnitude 360°/Zp. It is therefore irrelevant whether the angle is x° or x°+(360°/Zp).

The rotor angle is usually measured with the aid of an angle sensor. One known possibility is to use a signal-generator magnet and an AMR angle sensor, i.e. an angle sensor which utilizes an anisotropic magneto-resistive effect. However, as a result it is not possible to measure a rotor angle which is unambiguous in an unlimited angle range from 0 to 360° but rather only a rotor angle which is unambiguous in a limited angle range from 0 to 180°. It is therefore not possible to differentiate between a rotor angle of x° and one of x°+180°. Consequently, such an angle sensor system can be used only for synchronous machines with an even number of pole pairs.

In order to obtain an angle signal which is unambiguous in the unlimited angle range from 0 to 360°, the AMR angle sensor can be combined with two Hall sensors. German laid-open patent application DE 102 48 060 A1 describes, for example, such a magnetic field sensor arrangement for an angle sensor and a method for operating such a sensor arrangement. The described magnetic field sensor arrangement comprises an angle sensor by means of which the current angular position of a rotatable magnetic component can be measured in a predefined angle range. At least two sensor elements, by means of which the current magnetic field direction of the magnetic component can be measured, are assigned to the angle sensor, wherein the sensor elements are arranged with respect to one another in such a way that their axes which characterize the main measuring direction enclose an angle. However, with the described magnetic field sensor arrangement, additional components in the form of sensor elements are necessary.

In addition it is known that the rotor angle can be estimated by measuring electrical variables. For this purpose, two known effects can be utilized. For example, the voltage which is induced in the stator coils of the synchronous machine is dependent on the rotor angle. Furthermore, the inductances of the stator coils can depend on the rotor angle, depending on the design of the synchronous machine.

For example, German laid-open patent application DE 10 2006 004 166 A1 describes a method and a circuit arrangement for estimating the rotor angle of a synchronous machine in a stationary state. In accordance with the described method, three brief voltage pulses are applied to the stator windings of the synchronous machine in various directions. The rotor angle is then determined from the measured increases in current.

Patent AT 397 727 B describes, for example, a method and a circuit arrangement for the sensorless sensing of the rotational angle of a rotor of a synchronous machine. The described method determines the rotor angle by means of voltage pulses, it being assumed that the inductances of the stator coils of the synchronous machine depend on the rotor angle in an approximately sinusoidal shape.

It is therefore in principle possible to dispense with an angle sensor and to estimate the rotor angle. However, these angle-estimating methods require complex calculations, generate noise and are less accurate than if an angle sensor system is used.

SUMMARY OF THE INVENTION

The method according to the invention for determining a current angular position of a rotatable magnetic component in an electric drive has at least one advantage that a current angle measured value, which is unambiguously measured with an angle sensor system for a limited angle range, is converted into an unambiguous current angular position in an unlimited angle range using the direction and sign of the magnetic field of the rotatable magnetic component. In this context, the direction and sign of the magnetic field of the rotatable magnetic component are determined by applying first test pulses to the electric drive and by evaluating resulting second test pulses which are produced in the electric drive in reaction to the applied first test pulses.

The device according to the invention for determining a current angular position of a rotatable magnetic component in an electric drive has at least one advantage that there is an evaluation and/or control unit which receives, via an interface unit, information about a current angle measured value which is unambiguously measured within a predefined limited angle range, wherein the evaluation and/or control unit converts the current angle measured value, which is measured unambiguously for the limited angle range, into an unambiguous current angular position in an unlimited angle range using the direction and sign of the magnetic field of the rotatable magnetic component. In this context, the evaluation and/or control unit determines the direction and sign of the magnetic field of the rotatable magnetic component for an initial configuration by evaluating first test pulses which are applied to the electric drive, and second test pulses which are produced in the electric drive in reaction to the applied first test pulses.

Embodiments of the present invention advantageously permit the use of an angle sensor system which can unambiguously measure angle measured values only in a limited angle range of, for example, 0 to 180°, for electric drives which have an uneven number of pole pairs and preferably comprise a synchronous machine with an uneven number of pole pairs, without additional components such as, for example, Hall sensor elements. Since the angle measured values which are measured by the angle sensor system by using the direction and sign of the magnetic field of the rotatable magnetic component are converted into unambiguous angular positions in an unlimited angle range from, for example, 0 to 360° it is advantageously possible to carry out very precise determination of the current angular position with the angle sensor system which unambiguously measures the current angle measured value only within a predefined limited angle range, without additional components and without complex calculations. Since the direction and sign of the magnetic field of the rotatable magnetic component only have to be determined once for each initial configuration and the subsequent calculation of the current angular position can be carried out simply and quickly, the computational complexity in embodiments of the present invention is advantageously very low compared to the estimation methods which are known from the prior art and which do not use an angle sensor system. The angle sensor system comprises, for example, an AMR angle sensor which utilizes an anisotropic, magneto-resistive effect. Since such AMR angle sensors are cost-effectively manufactured in large numbers, simple and cost-effective implementation of the method according to the invention and/or of the device according to the invention is possible. In addition, embodiments of the present invention have, by virtue of the elimination of additional components, advantages with respect to the installation and costs compared to magnetic field sensor arrangements for an angle sensor system which are known from the prior art. In order to generate and measure the test pulses, components which are present in any case for controlling the electric drives can advantageously be used, which components can be embodied as part of the device according to the invention and/or can be coupled to the device according to the invention via corresponding interface units.

Embodiments of the invention can unambiguously measure, with the aid of the angle sensor system, for example the angle measured value of a rotor of the electric drive in the angle range from 0 to 180°. As a result, the direction of the rotor magnetic field, i.e. of a d axis of the rotor magnetic field, can be determined, but in the case of an uneven number of pole pairs the sign cannot be determined. The rotor has, for example, one pair of poles, wherein the position of the rotor magnetic field is predefined by magnetic axes which are fixed to the rotor and are also referred to as a d axis or q axis. When just one pole pair is used, there is precisely one d axis and one q axis. In the case of rotors with a plurality of pole pairs, there are correspondingly a plurality of d axes and q axes. The rotor magnetic field can, for example, be generated electrically by permanent magnets and/or by a winding.

It is now possible to energize the stator of the electric drive in such a way that a stator magnetic field is generated which has the same direction as the rotor magnetic field. Since the current angle measured value which is measured by the angle sensor system is unambiguous only to 180°, at this time it is not known whether the signs of the rotor magnetic field and of the stator magnetic field are the same. It is therefore not known whether the two magnetic fields are added or subtracted. If the magnetic fields are added, the total magnetic field is relatively large and the soft-magnetic material (iron) of the electric drive is saturated to a relatively high degree. If the magnetic fields are subtracted, the total magnetic field is relatively small and the iron is hardly saturated at all. Owing to the different saturation of the iron, the stator coils have different inductances in the two cases. If the fields are added, the saturation is stronger, and therefore the inductance is smaller and consequently the rise in current is steeper. If a positive and a negative voltage pulse are therefore applied in the d direction to the stator coils in succession, the rate of rise of the stator current is different with the two voltage pulses. It is then possible to infer the inductance and therefore the sign of the rotor magnetic field from the rate of rise of the current. It therefore becomes possible to decide which is the positive d direction and which is the negative d direction of the rotor magnetic field. In the direction with a relatively strong rise in current, the inductance is smaller, and the magnetic fields are therefore added. This is the positive d direction, in which a north pole of the rotor points. In the opposite direction, the inductance is larger and the magnetic fields are subtracted. This is the negative d direction in which a south pole of the rotor points.

This evaluation is carried out only once in an initial configuration which represents a stationary state of the electric drive. It is therefore possible for the direction and sign of the magnetic field of the rotatable magnetic component to be implemented, for example, at each system start in which the electric drive is installed, that is to say at every vehicle start. So that an unambiguous angle measured value is then always obtained, it is ensured that the time interval between two angle measurements is so short that in this time the angle changes by less than 90° even in the case of a maximum rotational speed of the synchronous machine. The zero position of the angle measured value of the angle-measuring sensor system is advantageously configured in such a way that the measured angle measured value corresponds to the angle of the d axis of the rotor magnetic field. The voltage absolute value of the generated test pulses and the time period for which the test pulses which are embodied as voltage pulses are applied to the electric drive are preferably predefined in such a way that the resulting currents are not of such a magnitude that the electric drive and/or an associated electronic system can be damaged, but are high enough that the currents can be sufficiently precisely measured with the current-measuring sensor system of the electric drive.

Embodiments of the present invention can be used in any system with an electric drive if an angle sensor system which unambiguously measures a current angle measured value only within a predefined limited angle range and a current sensor system are present and the electric drive has an uneven number of pole pairs.

The use in, for example, an electric (power) steering system, in electric tools with a synchronous machine or brushless direct current machine, in a hybrid drive with a combination of an internal combustion engine and an electric drive or in purely electrical driven vehicles is therefore possible.

It is particularly advantageous that the direction and sign of the magnetic field of the rotatable magnetic component are determined once for the respective initial configuration. As a result, the computational complexity for determining a current angular position can be significantly reduced. After the determination of the direction and sign of the magnetic field of the rotatable magnetic component, the current angle measured value which is unambiguous for the limited angle range is measured cyclically, wherein the current angle measured value which is measured unambiguously for the respective initial configuration in the limited angle range and the unambiguous current angular position which is calculated therefrom in the unlimited angle range are stored, after the calculation of the current angular position, as an old angle measured value or old angular position, wherein the current angular position, which is unambiguous for the unlimited angle range, is calculated on the basis of the old angular position and the old angle measured value and the current angle measured value which is measured unambiguously in the limited angle range, and wherein, after the calculation of the current angular position, the measured current angle measured value and the current angular position which is determined therefrom are stored as an old angle measured value or old angular position. This means that the "old" measured angle measured values or calculated angular positions are used again in the calculation of the current angular position carried out at a following time, wherein at later times no further generation or evaluation of test pulses for the calculation of the current angular position is carried out. The current angular position is preferably measured in a fixed time window with equidistant measuring times.

In one advantageous refinement of the method according to the invention, the first test pulses are generated as a function of predefined information and are applied to the electric drive at predefined actuation times for a specific time period, wherein the predefined information comprises a specific time period and/or a specific voltage absolute value and/or a specific direction. The first test pulses can therefore be applied, for example, as voltage pulses with the predefined voltage absolute value and corresponding predefined directions, to stator coils of the electric drive at predefined actuation times for the specific time period, wherein second test pulses resulting are measured and evaluated as current pulses at predefined measuring times, and wherein the predefined measuring times have substantially the same time intervals from corresponding actuation times.

In one advantageous refinement of the method according to the invention, resulting second test pulses, which are generated in reaction to first test pulses which have been applied to the synchronous machine at two successive actuation times, are evaluated in order to determine a length, resulting with respect to a first actuation time, of a first total current pulse and of a length, resulting with respect to a second actuation time, of a second total current pulse, wherein the current angle measured value, which is measured unambiguously for the limited angle range, is converted into an unambiguous current angular position in the unlimited angle range using the length of the first total current pulse and the length of the second total current pulse, from which the direction and sign of the magnetic field of the rotatable magnetic component are determined. If the length of the resulting first total current pulse which is determined at the first measuring time is, for example, greater than or equal to the length of the resulting second total current pulse which is determined at the second measuring time, the current angular position corresponds to the current angle measured value measured by the angle sensor system. However, if the length of the resulting first total current pulse which is determined at the first measuring time is shorter than the length of the resulting second total current pulse which is determined at the second measuring time, the current angular position does not correspond to the current angle measured value measured by the angle sensor system. In this case, a specific correction value is added to the current angle measured value. If the angle sensor system measures the current angle measured value within a predefined limited angle range of, for example, 0 to 180° unambiguously, in this case a correction value of 180° is added to the measured current angle measured value in order to determine the current angular position.

In one advantageous refinement of the device according to the invention, the evaluation and/or control unit itself generates the first test pulses as voltage pulses with the predefined voltage absolute value and corresponding predefined directions, as a function of predefined information, and applies said first test pulses directly to the electric drive via at least one interface unit at predefined actuation times for a specific time period. Alternatively, the evaluation and/or control unit applies predefined information to a voltage generator via at least one interface in order to generate the first test pulses, which voltage generator generates the first test pulses in reaction to the predefined information and applies said first test pulses to the electric drive at the predefined actuation times for the specific time period.

In a further advantageous refinement of the device according to the invention, the evaluation and/or control unit receives second test pulses resulting at predefined measuring times, as current pulses, directly from the electric drive and/or from a current-measuring device (26) via at least one interface unit, and evaluates them.

In a further advantageous refinement of the device according to the invention, the evaluation and/or control unit evaluates resulting second test pulses, which can be generated in reaction to first test pulses which are applied to the electric drive at two successive actuation times, in order to determine a length, resulting with respect to a first actuation time, of a first total current pulse ($I_1$) and a length, resulting with respect to a second actuation time, of a second total current pulse, wherein the evaluation and/or control unit converts the current angle measured value, which has been unambiguously measured in the limited angle range, into an unambiguous current angular position in the unlimited angle range using the length of the first total current pulse and the length of the second total current pulse, from which the direction and sign of the magnetic field of the rotatable magnetic component can be determined.

Embodiments of the present invention can be implemented as a circuit, device, method, data processing program with program code means and/or as a computer program product. Accordingly, the present invention can be implemented completely as hardware and/or as software and/or as a combination of hardware components and/or software components. In addition, the present invention can be implemented as a computer program product on a computer-useable storage medium with computer-readable program code, wherein various computer-readable storage media such as hard disks, CD-ROMs, optical or magnetic storage elements etc. can be used.

The computer-useable or computer-readable media may comprise, for example, electronic, magnetic, optical, electromagnetic, infrared or semiconductor systems, devices, equipment or dissemination media. In addition, the computer-readable media can comprise an electrical connection with one or more lines, a portable computer disc, a memory with direct access (RAM), a read-only memory (ROM), an erasable and programmable read-only memory (EPROM or flash memory, an optical line and a portable CD-ROM. The computer-useable medium or the computer-readable medium may even be paper or some other suitable medium on which the program is written and from which it can be read electrically, for example by means of an optical scanning process of the paper or of the other medium, and then compiled, interpreted or, if necessary, processed in some other way, and then stored in the computer memory.

BRIEF DESCRIPTION OF THE DRAWINGS

An exemplary embodiment of the invention is illustrated in the drawings and will be explained in more detail in the following description.

DETAILED DESCRIPTION

Figure 1:
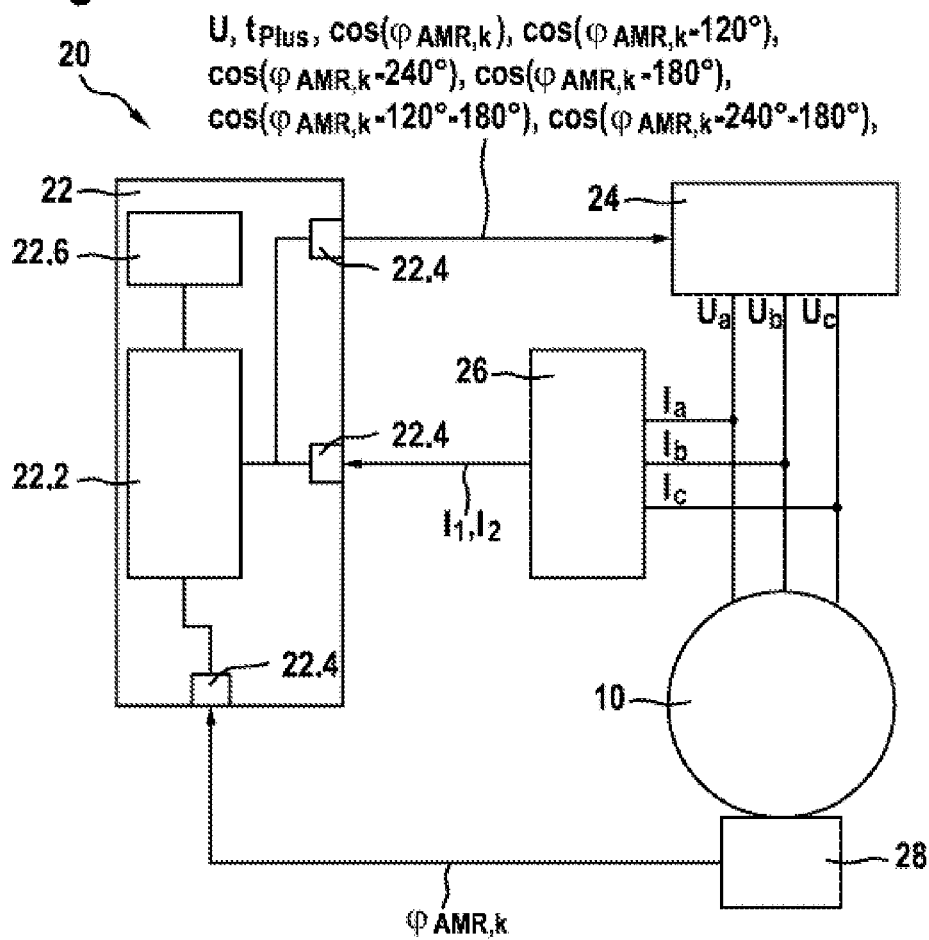
FIG. 1 shows a schematic block diagram of an exemplary embodiment of a device according to the invention for determining the rotor position of a synchronous machine.
Figure 2:
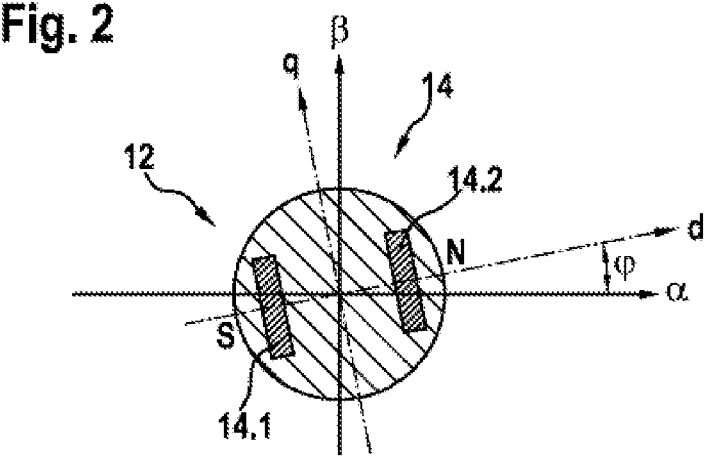
FIG. 2 shows a schematic illustration of an angular position of the rotor of a synchronous machine.

As is apparent from FIGS. 1 and 2, the illustrated exemplary embodiment of a device 20 according to the invention for determining a current angular position of a rotatable magnetic component 12 in an electric drive 10, which has a synchronous machine 10 with a rotor 12 in the illustrated exemplary embodiment, comprises an angle sensor system 28 which unambiguously measures a current angle measured value $\phi_{AMR,k}$ of the rotor 12 within a predefined limited angle range which is 0 to 180° in the illustrated exemplary embodiment. In addition, the illustrated electric drive or the synchronous machine 10 has an uneven number Zp of pole pairs.

According to the invention, an evaluation and/or control unit 22 receives, via an interface unit 22.4, information about the current angle measured value $\phi_{AMR,k}$, which is measured unambiguously in the limited angle range, and converts this measured current angle measured value $\phi_{AMR,k}$ into an unambiguous current angular position $\phi_k$ in an unlimited angle range, using the direction and sign of the magnetic field of the rotatable magnetic rotor 12. In this context, the evaluation and/or control unit 22 determines the direction and sign of the magnetic field of the rotatable magnetic component 12 for an initial configuration by evaluating first test pulses $U_a$, $U_b$, $U_c$ which are applied to the synchronous machine of the electric drive 10, and second test pulses $I_1$, $I_2$, $I_a$, $I_b$, $I_c$ which are produced in the synchronous machine of the electric drive 10 in reaction to the applied first test pulses $U_a$, $U_b$, $U_c$.

In the illustrated exemplary embodiment, the evaluation and/or control unit 22 generates predefined information which comprises a specific time period $t_{Puls}$ and/or a specific voltage absolute value U and/or a specific direction cos $(\phi_{AMR})$ cos$(\phi_{AMR}-120°)$, cos$(\phi_{AMR}-240°)$, cos$(\phi_{AMR}-180°)$, cos$(\phi_{AMR}-120°-180°)$, cos$(\phi_{AMR}-240°-180°)$. The evaluation and/or control unit 22 transmits the predefined information for generating the first test pulses $U_a$, $U_b$, $U_c$ via at least one interface 22.4 to a voltage generator 24 which generates the first test pulses as voltage pulses $U_a$, $U_b$, $U_c$ in reaction to the predefined information, and applies said test pulses to the electric drive 10 at predefined actuation times for the specific time period $t_{Puls}$. In an alternative embodiment (not illustrated), the functionality of the voltage generator (24) can be embodied as part of the evaluation and/or control unit 22, with the result that the evaluation and/or control unit 22 itself generates the first test pulses as voltage pulses $U_a$, $U_b$, $U_c$ with the predefined voltage absolute value U and corresponding predefined directions cos$(\phi_{AMR})$, cos$(\phi_{AMR}-120°)$, cos$(\phi_{AMR}-240°)$, cos$(\phi_{AMR}-180°)$, cos$(\phi_{AMR}-120°-180°)$, cos$(\phi_{AMR}-240°-180°)$ as a function of the predefined information U, $t_{Puls}$, cos $(\phi_{AMR})$, cos$(\phi_{AMR}-120°)$, cos$(\phi_{AMR}-240°)$, cos $(\phi_{AMR}-180°)$ cos$(\phi_{AMR}-120°-180°)$, cos$(\phi_{AMR}-240°-180°)$ and applies said test pulses directly to the electric drive 10 embodied as a synchronous machine, via at least one interface unit 22.4 at predefined actuation times for the specific time period $t_{Puls}$.

As is also apparent from FIG. 1, in the illustrated exemplary embodiment the evaluation and/or control unit 22 receives resulting second test pulses, at predefined measuring times, as current pulses $I_1$, $I_2$ via at least one interface unit 22.4 from a current-measuring device 26 which measures resulting phase current pulses $I_a$, $I_b$, $I_c$ of the synchronous machine of the electric drive 10 and determines the total current pulses $I_1$, $I_2$ from the measured phase current pulses $I_a$, $I_b$, $I_c$, and evaluates the resulting second test pulses $I_1$, $I_2$, $I_a$, $I_b$, $I_c$. In an alternative embodiment (not illustrated), the functionality of the current-measuring device 26 can be embodied as part of the evaluation and/or control unit 22, with the result that the evaluation and/or control unit 22 measures the phase current pulses $I_a$, $I_b$, $I_c$ directly in the synchronous machine of the electric drive 10 and determines and evaluates the total current pulses $I_1$, $I_2$.

In addition, the evaluation and/or control unit 22 has a computing unit 22.2 and a storage unit 22.6 in order to be able to carry out necessary calculations and storage processes.

As is also apparent from FIG. 2, the rotatable magnetic component 12, which is embodied as a rotor, comprises a pole pair 14 with a south pole 14.1 and a north pole 14.2. In FIG. 2, d and q denote the magnetic axes which are fixed to the rotor, and $\alpha$ and $\beta$ denote the axes which are fixed to the stator and $\phi$ denotes the current angular position.

Figure 3:
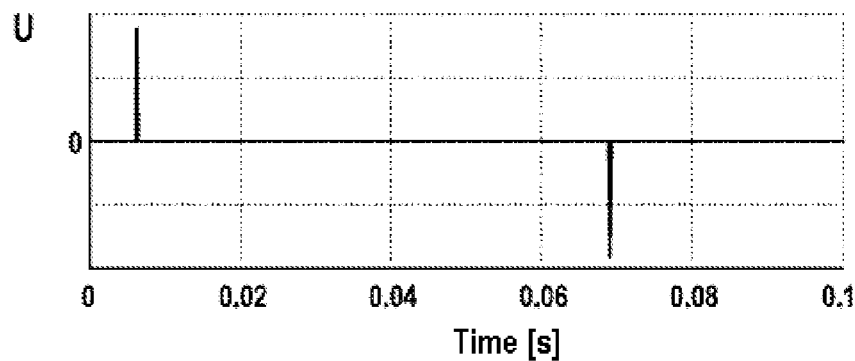
FIG. 3 shows a schematic profile of voltage pulses which are applied to stator coils of a synchronous machine.
Figure 4:
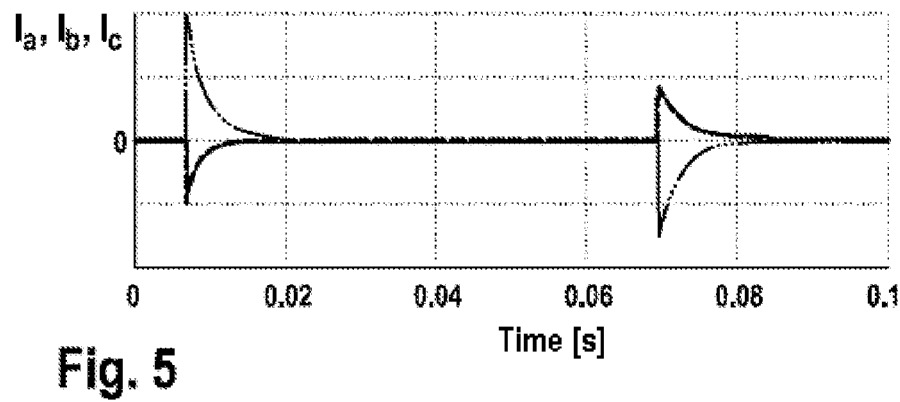
FIG. 4 shows a schematic profile of measured phase currents of the synchronous machine.
Figure 5:
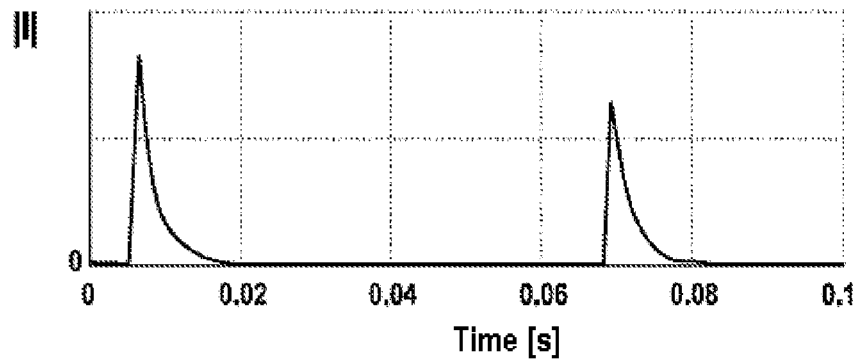
FIG. 5 shows a schematic profile of the total current resulting from the measured phase currents of the synchronous machine.

FIGS. 3 to 5 show typical profiles of the voltage absolute value U, of the phase current pulses $I_a$, $I_b$, $I_c$ and of the absolute value of the current I.

For the following functional description, it is always assumed that the electric machine is embodied as a three-phase synchronous machine 10 with an uneven number of pole pairs. It can also be analogously applied to any other phase number. For embodiments of the present invention, it is irrelevant whether the magnetic field of the rotatable magnetic component 12 which is embodied as a rotor is generated electrically by permanent magnets or by a winding. The angle sensor system 28 for unambiguously measuring the current angular position $\phi_{AMR}$ of the rotor 12 within the predefined limited angle range from 0 to 180° comprises at least one AMR angle sensor which utilizes an anisotropic, magnetoresistive effect.

By means of the angle sensor system 28, the current angle measured value $\phi_{AMR,k}$ can be measured unambiguously in the angle range from 0 to 180°. As a result, the direction of the magnetic field of the rotor 12, i.e. of the d axis, can be determined, but in the case of an uneven number of pole pairs the sign cannot be determined. FIG. 2 shows by way of example the structure of the rotor 12 with a pole pair 14 and the position of the magnetic axes d and q which are fixed to the rotor. In this exemplary embodiment there is precisely one d axis and one q axis. In the case of rotors with a plurality of pole pairs there are correspondingly a plurality of d and q axes. It is now possible to energize the stator in such a way that a stator magnetic field is generated which has the same direction as the rotor magnetic field. Since the measured current angle measured value $\phi_{AMR,k}$ is unambiguous only in the range from 0 to 180°, at this time it is not known whether the signs of the rotor magnetic field and of the stator magnetic field are the same. It is therefore not known whether the two magnetic fields are added or subtracted.

In accordance with the method according to the invention, the evaluation and/or control unit 22 reads in the measured current angle measured value $\phi_{AMR,k}$ which is measured by the angle sensor system 28, wherein the zero position of the angular position $\phi_k$ is defined in such a way that it is the angle of the d axis. The determination, described below, of the direction and sign of the magnetic field of the rotatable magnetic rotor 12 is carried out only once in the stationary state when the electric drive 10 which is embodied as a synchronous machine is started. In order then always to obtain an unambiguous current angle measured value $\phi_{AMR,k}$ it is ensured that the time interval between two angle measurements is so short that the angular position $\phi_k$ changes by less than 90° in this time even given a maximum rotational speed of the synchronous machine 10.

At a first actuation time $t_k$, first voltage pulses $U_a$, $U_b$, $U_c$ are applied to the stator coils for a time period of $t_{Puls}$ with predefined directions according to equation (1).

$$\begin{pmatrix} U_a \\ U_b \\ U_c \end{pmatrix} = \begin{pmatrix} \cos(\varphi_{AMR,k}) \\ \cos(\varphi_{AMR,k} - 120°) \\ \cos(\varphi_{AMR,k} - 240°) \end{pmatrix} U \quad (1)$$

As a result, the following applies at the first actuation time $t_k$: $U_a = U \cos(\phi_{AMR,k})$, $U_b = U \cos(\phi_{AMR,k}-120°)$, $U_c = U \cos(\phi_{AMR,k}-240°)$. Here, the positive voltage absolute value U and the time period $t_{Puls}$ are predefined in such a way that resulting currents are not so high that the electric drive 10 or the control electronics can be damaged, but are high enough that the currents can be measured sufficiently precisely with the current sensor system 26 of the electric drive 10.

The level of the resulting first total current pulse $I_1$ is calculated from the phase currents $I_a$, $I_b$, $I_c$, which are measured at a first measuring time $t_1$ and are produced in reaction to the voltages pulses $U_a$, $U_b$, $U_c$ applied at the first actuation time $t_k$, using equation (2):

$$I_{1,2} = \sqrt{I_a^2 + I_b^2 + I_c^2 - I_a I_b - I_a I_c - I_b I_c} \qquad (2)$$

The value of the total current pulse $I_1$ corresponds to the length of the current vector which is calculated from the three phase currents $I_a$, $I_b$, $I_c$. The phase currents $I_a$, $I_b$, $I_c$ are measured at the end of the voltage pulse or shortly before.

At a subsequent second actuation time $t_{k+1}$, second voltage pulses $U_a$, $U_b$, $U_c$ are applied to the stator coils for a period of $t_{Puls}$ with predefined directions according to equation (3).

$$\begin{pmatrix} U_a \\ U_b \\ U_c \end{pmatrix} = \begin{pmatrix} \cos(\varphi_{AMR,k}) \\ \cos(\varphi_{AMR,k} - 120°) \\ \cos(\varphi_{AMR,k} - 240°) \end{pmatrix} (-U) = \begin{pmatrix} \cos(\varphi_{AMR,k} - 180°) \\ \cos(\varphi_{AMR,k} - 120° - 180°) \\ \cos(\varphi_{AMR,k} - 240° - 180°) \end{pmatrix} U \qquad (3)$$

As a result, at the second actuation time $t_{k+1}$ the following the applies: $U_a = (-U) \cos(\phi_{AMR,k}) = U \cos(\phi_{AMR,k} - 180°)$, $U_b = (-U) \cos(\phi_{AMR,k} - 120°) = U \cos(\phi_{AMR,k} - 120° - 180°)$, $U_c = (-U) \cos(\phi_{AMR,k} - 240°) = U \cos(\phi_{AMR,k} - 240° - 180°)$.

The level of the resulting second total current pulse $I_2$ is calculated from the phase currents $I_a$, $I_b$, $I_c$ which are measured at the second measuring time $t_2$ and are produced in reaction to the voltage pulses $U_a$, $U_b$, $U_c$ which are applied at the second actuation time $t_{k+1}$. It is important here that the time period from the start of the voltage pulses up to the measurement of the current is the same as in the first measurements.

If the resulting first total current pulse $I_1$ which is determined at the first measuring time $t_1$ is greater than or equal to the resulting second total current pulse $I_2$ which is determined at the second measuring time $t_2$, the current angular position $\phi_k$ of the rotor 12 corresponds to the current angle measured value $\phi_{AMR,k}$ i.e. $\phi_k = \phi_{AMR,k}$, measured by the angle sensor system 28. If the resulting first total current pulse $I_1$ which is determined at the first measuring time $t_1$ is smaller than the resulting second total current pulse $I_2$ determined at the second measuring time $t_2$, the current angular position $\phi_k$ of the rotor 12 corresponds to an angle total obtained from the current angle measured value $\phi_{AMR,k}$ measured by the angle sensor system 28, and a correction value of 180°, i.e. $\phi_k = \phi_{AMR,k} + 180°$.

The current angular position $\phi_k$ and the measured angle measured value $\phi_{AMR,k}$ are stored in the memory 22.6. Subsequently, the angle measured value $\phi_{AMR,k}$ is measured cyclically, ideally with a fixed timing pattern with equidistant angle measuring times $t_1$ to $t_n$. At each angle measuring time $t_k$ where k=1 to n, the new current angular position $\phi_k$ of the rotor 12 is calculated from an old measured angle measured value $\phi_{AMR,k-1}$ from the last angle measuring time $t_{k-1}$, the old angular position $\phi_{k-1}$ calculated at the last measuring time $t_{k-1}$, and a current angle measured value $\phi_{AMR,k}$ measured at the current time $t_k$.

If the absolute value of the difference between the old measured angle measured value $\phi_{AMR,k-1}$ and the measured current angle measured value $\phi_{AMR,k}$ is smaller than the product of the time difference of the angle measuring times ($t_k - t_{k-1}$) and the maximum possible angular speed $\omega_{max}$, i.e. $|\phi_{AMR,k} - \phi_{AMR,k-1}| < (t_k - t_{k-1}) \omega_{max}$, the current angular position $\phi_k$ of the rotor 12 has not yet exceeded the limit 0°/180°, where $\omega_{max}$ is the maximum possible angular speed of the synchronous machine 10. The current angular position $\phi_k$ of the rotor 12 is therefore calculated for this case from equation (4):

$$\phi_k = \phi_{k-1} + \phi_{AMR,k} - \phi_{AMR,k-1} \qquad (4)$$

If the absolute value of the difference between the old measured angle measured value $\phi_{AMR,k-1}$ and the current measured angle measured value $\phi_{AMR,k}$ is greater than the product of the time difference between the measuring times ($t_k - t_{k-1}$) and the maximum possible angular speed $\omega_{max}$, i.e. $|\phi_{AMR,k} - \phi_{AMR,k-1}| > (t_k - t_{k-1}) \omega_{max}$, the current angular position $\phi_k$ of the rotor 12 has exceeded the limit 0°/180°, wherein $\omega_{max}$ is the maximum possible angular speed of the synchronous machine. The current angular position $\phi_k$ of the rotor 12 is therefore calculated for this case from equation (5).

$$\phi_k = \mathrm{mod}(\phi_{k-1} + \phi_{AMR,k} - \phi_{AMR,k-1} + 180°, 360°) \qquad (5)$$

FIGS. 3 to 5 show typical profiles of the voltage absolute value U, of the phase current pulses $I_a$, $I_b$, $I_c$ and of the absolute value I of the current. It is clearly apparent that the first total current pulse $I_1$ is higher than the second total current pulse $I_2$. The first voltage pulses have therefore been applied in the direction of the north pole of the permanent magnet, with the result that the stator field and the rotor field are superimposed on one another positively.

Embodiments of the present invention can be used in any electric drive if an angle sensor system which unambiguously measures the current angular position of the rotor within a predefined limited angle range and a current sensor system are present and the electric drive has an uneven number of pole pairs.

The invention claimed is:

1. A method for determining a current angular position of a rotatable magnetic component in an electric drive which has an uneven number of pole pairs, the method comprising:
measuring a current angle measured value of the rotatable component with an angle sensor system which unambiguously measures the current angle measured value only within a predefined limited angle range, and
converting the current angle measured value which is unambiguously measured in the limited angle range into an unambiguous current angular position in an unlimited angle range using the direction and sign of the magnetic field of the rotatable magnetic component,
wherein the direction and sign of the magnetic field of the rotatable magnetic component are determined by applying first test pulses to the electric drive and by evaluating resulting second test pulses which are produced in the electric drive in reaction to the applied first test pulses.

2. The method as claimed in claim 1, wherein the direction and sign of the magnetic field of the rotatable magnetic component are determined once for the respective initial configuration.

3. The method as claimed in claim 2, wherein the current angle measured value which is unambiguous for the limited angle range is measured cyclically,
wherein the current angle measured value which is measured unambiguously for the respective initial configuration in the limited angle range and the unambiguous current angular position which is calculated therefrom in the unlimited angle range are stored, after the calculation of the current angular position, as an old angle measured value or old angular position, wherein the current angular position, which is unambiguous for the unlimited angle range, for a first time is calculated on the basis of the old angular position and the old angle measured value and the current angle measured value which is measured unambiguously in the limited angle range, and wherein, after the calculation of the current angular position, the measured current angle measured value and the current angular position which is determined therefrom are stored as an old angle measured value or old angular position.

4. The method as claimed in claim 1, wherein the first test pulses are generated as a function of predefined information and are applied to the electric drive at predefined actuation times for a specific time period, wherein the predefined information comprises a specific time period and/or a specific voltage absolute value and/or a specific direction, which is determined as a function of the current angle measured value.

5. The method as claimed in claim 1, wherein the first test pulses are applied, as voltage pulses with the predefined voltage absolute value and corresponding predefined directions, to stator coils of the electric drive at predefined actuation times for the specific time period, wherein second test pulses resulting are measured and evaluated as current pulses at predefined measuring times, and wherein the predefined measuring times have substantially the same time intervals from corresponding actuation times.

6. The method as claimed in claim 1, wherein resulting second test pulses, which are generated in reaction to first test pulses which have been applied to the electric drive at two successive actuation times, are evaluated in order to determine a length, resulting with respect to a first actuation time, of a first total current pulse and of a length, resulting with respect to a second actuation time, of a second total current pulse, wherein the current angle measured value, which is measured unambiguously in the limited angle range, is converted into an unambiguous current angular position in the unlimited angle range using the length of the first total current pulse and the length of the second total current pulse, from which the direction and sign of the magnetic field of the rotatable magnetic component are determined.

7. A device for determining a current angular position of a rotatable magnetic component in an electric drive having an angle sensor system which unambiguously measures a current angle measured value of the rotatable component within a predefined limited angle range, wherein the electric drive has an uneven number of pole pairs, the device comprising:

an evaluation and/or control unit which receives information about the measured current angle measured value via an interface unit, wherein the evaluation and/or control unit converts the current angle measured value, which is measured unambiguously for the limited angle range, into an unambiguous current angular position in an unlimited angle range using the direction and sign of the magnetic field of the rotatable magnetic component, wherein the evaluation and/or control unit determines the direction and sign of the magnetic field of the rotatable magnetic component for an initial configuration by evaluating first test pulses which are applied to the electric drive, and second test pulses which are produced in the electric drive in reaction to the applied first test pulses.

8. The device as claimed in claim 7, wherein the evaluation and/or control unit itself generates the first test pulses as voltage pulses with the predefined voltage absolute value and corresponding predefined directions as a function of predefined information, and applies said first test pulses directly to the electric drive via at least one interface unit at predefined actuation times for a specific time period, or applies predefined information to a voltage generator via at least one interface in order to generate the first test pulses, which voltage generator generates the first test pulses in reaction to the predefined information and applies said first test pulses to the electric drive at the predefined actuation times for the specific time period.

9. Device according to claim 7, wherein the evaluation and/or control unit receives second test pulses resulting at predefined measuring times, as current pulses, directly from the electric drive and/or from a current-measuring device via at least one interface unit, and evaluates them.

10. Device according to claim 7, wherein the evaluation and/or control unit evaluates resulting second test pulses, which can be generated in reaction to first test pulses which are applied to the electric drive at two successive actuation times, in order to determine a length, resulting with respect to a first actuation time, of a first total current pulse and a length, resulting with respect to a second actuation time, of a second total current pulse, wherein the evaluation and/or control unit converts the current angle measured value, which has been unambiguously measured for the limited angle range, into an unambiguous current angular position in the unlimited angle range using the length of the first total current pulse and the length of the second total current pulse, from which the direction and sign of the magnetic field of the rotatable magnetic component can be determined.

* * * * *